July 29, 1941.  H. E. MORTON  2,250,595
CUTTING MACHINE
Filed Dec. 11, 1939   2 Sheets-Sheet 1
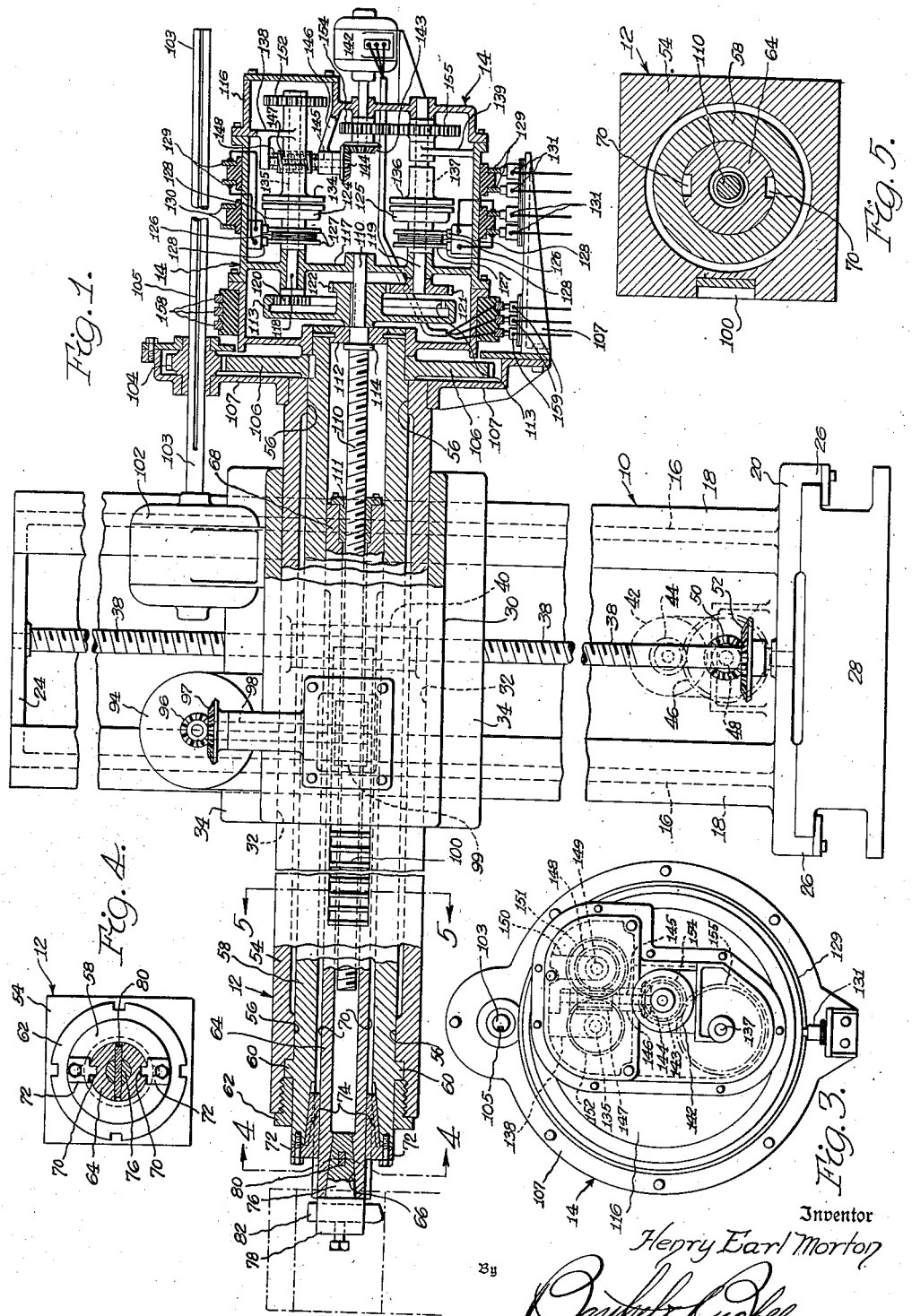
Inventor
Henry Earl Morton
By
Attorneys

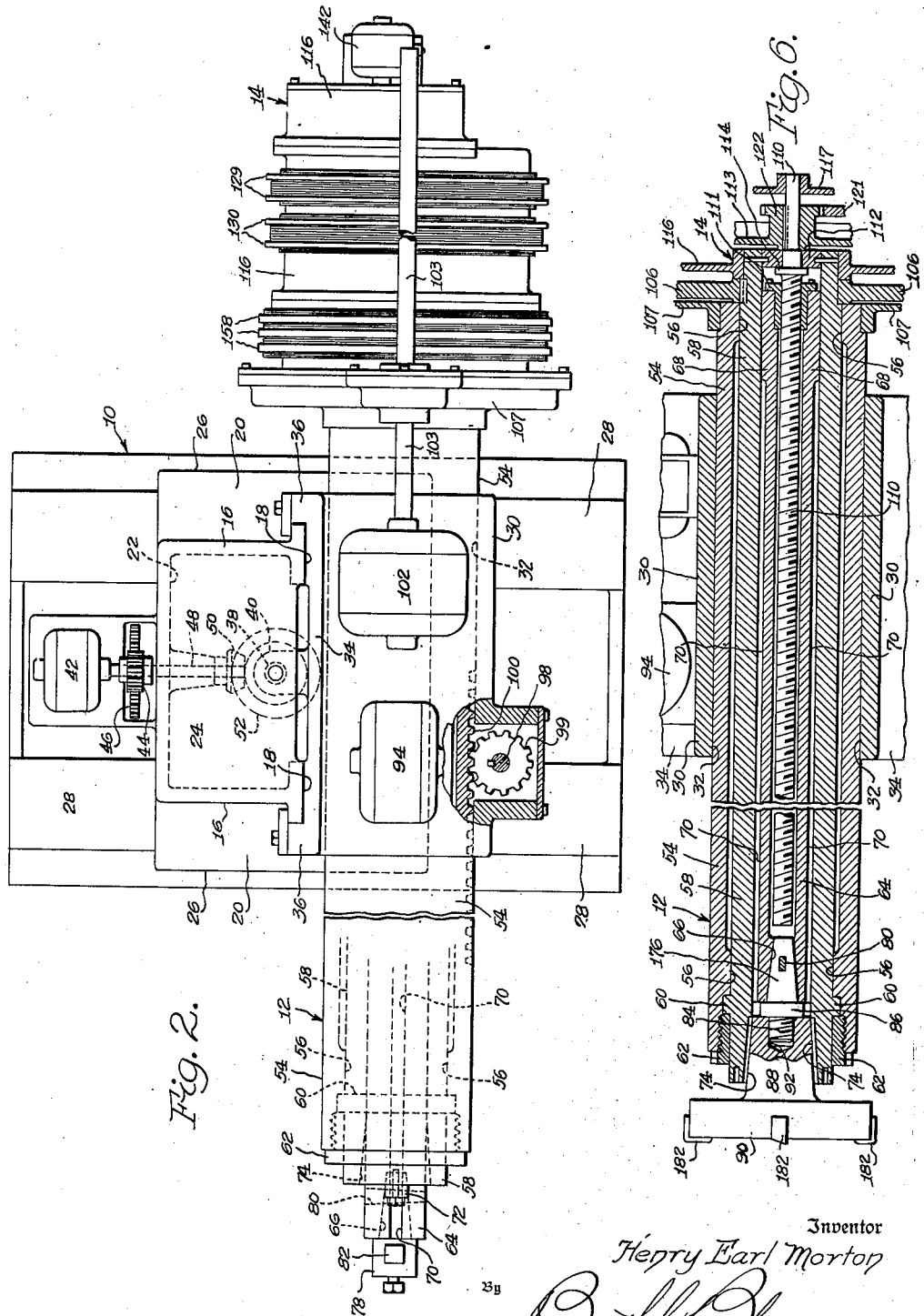

Patented July 29, 1941

2,250,595

UNITED STATES PATENT OFFICE 2,250,595

CUTTING MACHINE

Henry Earl Morton, Muskegon Heights, Mich.

Application December 11, 1939, Serial No. 308,592

8 Claims. (Cl. 29—26)

This invention relates, in general, to cutting machines and, in particular, to a new and improved structure for supporting and/or driving the tool thereof.

One of the objects of this invention is to provide a new and improved cutting machine wherein the drive for reciprocating the tool and its support is confined within said support which, as distinguished from an externally arranged drive, enables the machine to be operated in a minimum space though between maximum limits of protraction and retraction.

Another object is to provide a new and improved cutting machine wherein the necessity for longitudinally moving the driving structure for and with the tool and its support is eliminated, thereby enabling the machine to be operated with greater efficiency, less power and in a smaller space then heretofore.

Another object is to provide a new and improved cutting machine which is more readily and easily made adaptable for tools of different sizes than machines at present well known.

Another object is to provide a new and improved cutting machine which is more efficiently constructed and operable, possesses a wider and more flexible scope of utility and has its parts more advantageously arranged and inter-related than heretofore.

Another object is to provide a cutting machine of the type to be described with a new and improved drive mechanism for the tool which is more compact in construction and which has a greater and more readily available range of selective, operative speeds, not only of rotation but of reciprocation as well, than heretofore, which may be employed not only for and during reciprocation and rotation of the tool being used but also for and during the substitution or replacement of one tool for or by another, and which does not require longitudinal movement to move the tool longitudinally, thereby requiring a smaller space for its operation than usual.

Other objects and advantages of the invention will become readily apparent from a reference to the following specification taken in conjunction with the accompanying drawings of which there are two (2) sheets and wherein:

Figure 1 is a front elevational view of the machine with its tool in operative position on the work, the showing being partly broken away and in section to illustrate more clearly some of the details of its construction;

Fig. 2 is a plan view of the showing in Fig. 1 and being similarly broken away and partially sectioned;

Fig. 3 is a right end elevational view of the showing in Fig. 1;

Figs. 4 and 5 are sections taken along the lines 4—4 and 5—5, respectively in Fig. 1; and Fig. 6 is a view similar to Fig. 1 but showing the presence of and adaptation for a modified form of tool with the reciprocator therefor in a more greatly protracted position than in Fig. 1.

The cutting machine herein disclosed and to be described comprises, in general, a main supporting structure, generally indicated at 10, a tool supporting structure, generally indicated at 12 and movably supported, as will be seen, by said structure 10, and a driving structure, generally indicated at 14, for, as will be seen, rotating and/or reciprocating parts of said movable structure 12.

Considering, first, the main supporting structure 10, said structure comprises a pair of uprights 16 arranged in parallelism and spaced from each other in the direction of tool movement, the front vertical edge of each of said uprights preferably being formed with an upstanding flange 18 extending in the direction of said tool movement, and said uprights being integrally interconnected, at the base thereof, by means of a base plate 20, at the rear thereof, by means of a rear plate 22, and at the top thereof, by means of a top plate 24. The base plate 20 is preferably provided along its two longitudinally spaced, transverse edges with a pair of parallel flanges 26, and cooperable with to be guided by said flanges are portions formed on the sides of a base member 28 whereby, as is more than likely to be desired, the unitary support 16—20—22—24 of the structure 10 is made selectively movable in a horizontal direction transverse to tool movement relatively to said base member 28 of said structure 10. In addition, and as is clearly possible, the base member 28 may be provided with means (not shown) whereby said member and the unit 16—20—22—24 may be made selectively movable, unitarily, in any desired horizontal direction.

Still considering the main supporting structure 10, said structure also comprises an auxiliary support or carrier consisting of an elongated boss 30 formed therethrough with a horizontal bore 32 of, preferably, polygonal cross section extending in the direction of tool movement, said boss being integrally formed therewith at the rear thereof with an upstanding, longitudinally extending plate 34. Plate 34, along its two vertical edges, is formed with a pair of rearwardly extending, vertical flanges 36 which are cooperable with the flanges 18 on the uprights 16 and guided thereby to enable the unit 30—34, or carrier, to be moved relatively to the unit 16—20—22—24, and selectively, in a vertical direction. For so moving the unit 30—34, a vertical screw 38 is employed and has its ends journaled for rotation in the base plate 20 and the top plate 24, said screw intermediate said ends passing through and being in driving engagement with an internally threaded boss 40 integrally formed on and with the plate 34, so that the turning of said screw 38 will move said unit 30—34, through the agency of said boss 40, vertically toward and from said plates 20 and 24, or, in other words, relatively to the unit 16—20—22—24.

One of the many possible arrangements adapted for turning the screw 38 in its two rotary directions for raising and lowering the unit 30—34 of the structure 10 relatively to the unit 16—20—22—24 of said structure is shown in the figures and comprises, a bidirectional motor 42 supported by for transverse movement with said unit 16—20—22—24, a pinion 44 mounted on for rotation with the drive shaft of said motor, a gear 46 in mesh with said pinion and mounted on for rotation with a transverse, horizontal shaft 48 rotatably carried by said unit 16—20—22—24, a bevel pinion 50 mounted on for rotation with said shaft 48, and a bevel gear 52 in mesh with said pinion 50 and mounted on for rotation with said screw 38.

Since, as will be seen, the unit 30—34 of the main supporting structure 10 at least indirectly supports the cutting tool, and since, as has been seen, said unit is supported by the unit 16—20—22—24 of said structure, and since, as has also been seen, said latter unit is supported by the base member 28 of said structure, the aforementioned horizontal movability of said structure as a whole, the unitary, transverse movability of said units relatively to said base member, and the vertical movability of said unit 30—34 relatively to said unit 16—20—22—24 and said base member all tend toward enabling said structure and its elements to be positioned as closely to the work as may be desired.

Now considering the tool supporting structure 12, said structure comprises an elongated support, such as a ram 54, polygonally formed at its outer periphery along its length so as to be received and supported non-rotatably by the bore 32 in the boss 30 for reciprocation relatively thereto, said ram being as long as desired but preferably long enough so as to extend outwardly from both ends of said boss. The support or ram 54 is hollow therethrough in the common direction of the length and of the path of reciprocation thereof and is integrally formed internally with a plurality of coaxially aligned bearings 56 in which there is mounted, for rotation relatively to said ram, an elongated shaft or arbor 58, said shaft or arbor being itself hollow therethrough in the direction of the length thereof and being long enough, preferably, so as to extend outwardly from both ends of said ram. Though the shaft or arbor 58 is rotatable relatively to the support or ram 54, it is intended to have said arbor reciprocate with said ram; so, to unify the reciprocation of these two members, said arbor is externally formed near the end thereof corresponding to the tool end of the machine with an annular enlargement 60 which abuts the adjacent side of the nearest bearing 56 on said ram and is held in place thereagainst by means of a removable nut 62 sleeved on said arbor and threadedly tightened into said ram against said enlargement. In short, then, the ram 54 and the arbor 58, of the tool supporting structure 12, are unitarily reciprocable relatively to the main supporting structure 10 along the bore 32, and said arbor is rotatable relatively to said ram and said structure 10 within the bore defined by the bearings 56.

Still referring to the tool supporting structure 12, said structure also comprises an elongated spindle 64 which is operable for being positioned within the arbor 58 and is preferably shorter in length than said arbor. The spindle 64 is hollow therethrough in the direction of the length thereof and is internally tapered at 66 for reasons which will presently appear, which is at the end thereof corresponding to the tool end of the machine, said spindle being externally enlarged at its opposite end, as at 68, for journalled engagement with the internal wall of the arbor 58. Since it is desired to have the spindle 64 rotate with the arbor 58, yet reciprocate relatively thereto, said spindle is externally formed along its length ahead of the enlargement 68 with a pair of diametrically opposite slots 70, and cooperable with said slots for causing said spindle to rotate with said arbor and still permit said spindle to reciprocate longitudinally relatively to said arbor is a pair of diametrically opposite and individual key or drive members 72 secured to the protractible end of said arbor and extending into tapered portions 74 provided therefor in said arbor as well as into said slots. The complementarily tapered key members 72 and portions 74 clearly tend to center the spindle 64 with respect to the bore provided therefor in the arbor 58, and the keyed engagement between said members and the longitudinal slots 70 clearly tends to drive said spindle rotatably with said arbor and permit said spindle to move longitudinally relatively to said arbor.

Referring to Figs. 1, 2 and 4, as distinguished from Fig. 6, the tapered portion 66 in the end of the spindle 64 is seen to receive the tapered shank 76 of a tool holder 78, there being provided a key 80 or other such means interconnecting said shank and said spindle for insuring a rigid, though separable, union therebetween. The holder 78, in any appropriate manner, is adapted for supporting, preferably adjustably and removably, a tool 82 of the type and design suitable for the work to be done thereby. It is clear that the tool 82 and its holder 78—76 are readily and easily removable from the spindle 64 by removing the key 80 from said spindle and the shank of said holder.

The tool supporting structure 12, so far described with respect to its ability to support toolholder assemblies of which the assembly 82—78—76 of Figs. 1, 2 and 4 is typical, is also capable of supporting assemblies, such as the one shown in Fig. 6, without serious modification of said structure. So, in the event the nature of the work demands the employment of a tool, or plurality thereof, such as is shown in Fig. 6, the key 80 is removed from the spindle 64 and shank 76, the tool-holder 82—78—76 is removed from said spindle, and the key members 72 are removed from said spindle and the arbor 58. Then, there is provided a structure which comprises, a member having a tapered shank end 176 dimensionally similar to the shank 76, a threaded end 84 and a shoulder-forming portion 86 integrally disposed therebetween, and another member having a tapered shank end 88 dimensionally similar to the taper 74 in the arbor 58, a tool-holder 90 integral with said end 88 and a tool 182 or plurality thereof carried either fixedly or adjustably by said holder. This tool-holder 182—90—88 is formed with a threaded bore 92 for threadedly receiving the threaded end 84 so as to unify said tool-holder and the member 84—86—176, whereupon the insertion of the shank end 176 into the tapered bore 66 of the spindle 64 originally occupied by the aforementioned shank 76 and the removable locking together of said spindle and said end 176 by means of the aforementioned key 80 bring about the unification of said spindle, said member 84—86—176 and said tool-holder 182—90—88. Obviously, the substitution of the tool-holder 182—90—88 for the tool-holder 82—78—76 depends only upon dispensing with the key members 72 and providing said tool-holder 182—90—88 with a shank, such as the shank 176, for cooperation with the tapered bore 66, so that the portions 84, 86 and 92 of the member 84—86—176 and of said tool-holder 182—90—88 may be dispensed with and said shank 176 may itself be made integral with said tool-holder 182—90—88, and, such a modified construction is contemplated. Finally, with the spindle 64 and the tool-holder 182—90—88 so interconnected, it only remains to retract said spindle relatively to the arbor 58 so as to wedge the tapered shank 88 into the taper 74 of said arbor, whereupon said wedged connection will serve as a rotatable drive between said arbor and said tool-holder-spindle unit, said arbor, of course, constituting the driving member and said unit the driven member.

The driving structure for the tool and/or its supporting structure 12, and which is indicated in the drawings generally at 14, comprises, in part, a bi-directional motor 94 supported by and for movement with the vertically movable boss 30, a bevel pinion 96 fixed on and for rotation with the drive shaft of said motor, a bevel gear 97 in driven mesh with said pinion and fixed on and for rotation with the upper end of a vertical shaft 98 which resides in a proper housing and bearings provided therefor on said boss and is arranged slightly ahead of the front side of the ram 54, a pinion 99 fixed on and for rotation with the lower end of said shaft 98, and a horizontal, longitudinal rack 100 fixedly carried on or formed in said front side of said ram for movement therewith and in driven engagement with said pinion 99. It will be seen, then, that through the rack 100 and pinion 99 the tool supporting structure 12 may be and is movable as a unit horizontally, longitudinally and relatively to the supporting structure 10 by and in accordance with the rotation of the motor 94.

The driving structure 14 also comprises, in part, a motor 102 supported by and for movement with the vertically movable boss 30 of the structure 10 and having an elongated drive shaft 103 extending in a direction parallel with the direction of the path of reciprocation of the tool supporting structure 12 and away from the tool end of the machine, a pinion 104 carried on said shaft and internally carrying a key cooperable with an elongated slot or keyway 105 formed in said shaft along the length thereof whereby said pinion is rotatable with said shaft as well as being movable relatively thereto therealong, and a gear 106 in driven mesh with said pinion and fixedly carried on the arbor 58 next to the adjacent end of the ram 54 for rotating said arbor, said gear being preferably of larger diameter than said pinion for purposes of speed reduction. A housing 107 is sleeved about the end of the non-rotatable ram 54 and is fixed thereto for axial movement therewith for providing, among other things which will soon be described, a bearing support for the pinion 104. It will be seen then, that the arbor 58 of the structure 12 is rotated by the motor 102 through the agency of the pinion 104 and gear 106 of the structure 14 and that this rotation is not interrupted by the longitudinal movement of said structure 12 relatively to the structure 10 by the motor 94 through the agency of the rack 100 and pinion 99 of said structure 14 because of the provision of the elongated slot or keyway 105 in the shaft 103 and the keyed engagement therewith by said pinion.

The structure 14 further comprises, in part, an elongated screw or driving member 110 for the spindle 64, said screw being threadedly received by a nut or driven member 111 carried by said spindle at the end thereof opposite its tool-carrying end, and one end of said screw extending axially through said spindle toward said tool-carrying end but in no protracted or retracted position of said spindle with respect to the arbor 58 and ram 54 does said screw reach said latter end. The opposite end of the screw 110 is unsplined and passes outwardly through a member 112 fixedly carried by the arbor 58 for movement therewith and providing a bearing support for said screw thereat. This outer end of the screw 110 has keyed thereto for rotation therewith an internally splined ring gear 113 the main function of which is to be described presently, and it is to be noted that said gear, in addition to its inability to rotate relatively to said screw, is held against axial movement therealong, so that said gear, which resides on one side of and in abutment with the bearing member 112, and a collar 114, which is fixed on said screw at a position of abutment with the opposite side of said member, cooperate to hold said screw against axial movement relatively to the arbor 58, said member, of course, permitting said screw, under conditions to be described, to rotate relatively thereto and to said arbor. It is clear, therefore, that the rotation of the gear 106 results in the unitary rotation at the same speed of the arbor 58, the spindle 64, the screw 110 and the gear 113, that is, when there is no force applied to oppose or interrupt this unitary rotation, and, under this condition, said screw will have no longitudinal driving effect upon said spindle.

The structure 14 also comprises, in part, a housing or casing 116 which is sleeved about and rigidly connected to the end of the arbor 58 which carries the gear 106 so as to be rotatable and axially movable therewith about and along the central, longitudinal axis of the structure 12, which axis, as is seen, is coincident with the axis of the screw 110. The rotatable casing 116 is internally formed with a rigid, vertical wall 117 in which is supported for rotation about their own axes and for movement with said wall a pair of horizontal shafts 118 and 119, said shaft 118 carrying on one of its ends for rotation therewith a pinion 120 in driving mesh with the ring gear 113, and said shaft 119 carrying on one of its ends for rotation therewith a pinion 121 in driving mesh with a gear formation 122 formed on the hub of said ring gear. Normally, the shafts 118 and 119 are idly held within the bearings provided therefor in the wall 117, so that the casing 116, said shafts and their pinions 120 and 121, the ring gear 113, the screw 110, the spindle 64 and the arbor 58 will rotate unitarily about the axis of said screw with, upon and during the rotation of the gear 106, there being, therefore, no relative longitudinal movement of said spindle. In other words, when the gear 106 rotates, and when the shafts 118 and 119 have no forces applied to them to rotate them about their own axes, there will be no relative rotation between the screw 110 and the spindle 64 nor will there be any between the pinions 120 and 121 and the gears 106 and 122, so that there will be no relative longitudinal movement between said spindle, said screw and the arbor 58.

It will be noted in Fig. 1 that the effective diameter of the driven ring gear 113 is greater than the effective diameter of its driving pinion 120, and that the effective diameters of the driven gear formation 122 and its driving pinion 121 are substantially equal, the reasons being that, when it is desired to rotate the screw 110 relatively to the spindle 64 in order to protract or retract the latter relatively to said screw and the arbor 58, such protraction or retraction may be accomplished relatively slowly through the gear reduction 120—113 or more quickly, if desired, through the connection 121—122.

A system of magnetic clutches has been chosen to illustrate the means whereby the pinions 120 and 121 may be selectively driven so as to drive, at different times and at different speeds, the screw 110 relatively to the spindle 64, it being clear that said screw may longitudinally move said spindle relatively to the arbor 58 and ram 54 when said spindle is merely rotating with said arbor, or when it is so rotating as well as moving longitudinally with said arbor and said ram, or when it is stationary and not rotating, or when it is not rotating but is moving longitudinally with said arbor and said ram. So, on the ends of the shafts 118 and 119 opposite the ends carrying the pinions 120 and 121 there is fixed for rotation therewith and against axial movement therealong a pair of magnetic clutch members 124 and 125 each being provided with for energization by an individual magnetizing coil 126, said coils being properly connected to their respective clutch members so that, upon the passage of current through said coils, said members will be magnetized. Since each of the clutch members 124 and 125 and its respective magnetizing coil 126 are caused at one time or another to rotate with their supporting shaft 118 or 119 relatively to the casing 116, it is desirable that the terminals of said coils be in the form of ring conductors 127 which are rotatable with said shafts and in permanent, slidable contact with conductors 128 fixedly carried within and on said casing for movement therewith. The incoming and outgoing current leads for and connected to the two conductors 128 employed for magnetizing the clutch member 124 are connected to a pair of ring conductors 129 externally carried on said casing for movement therewith and being properly insulated from each other and from said casing, while the incoming and outgoing current leads for and connected to the other two conductors 128 employed for magnetizing the clutch member 125 are connected to a pair of ring conductors 130 carried and insulated similarly as said conductors 129. Since the casing 116 is rotatable, it is desirable that the conductors 129 and 130 externally carried thereby be permanently and slidably engageable with conductors 131 which are stationarily carried on the non-rotatable housing 107 or a section integral therewith. As indicated in Fig. 1, the circuit containing the clutch member 124 for controlling the operation of the pinion 120 (which drives the screw 110 at the slower of its two rotative speeds) is separate and distinct from the circuit containing the clutch member 125 for controlling the operation of the pinion 121 (which drives said screw at the faster of its two rotative speeds), and it is obvious, therefore, that the closing and energization of one of said circuits must never occur while the other of said circuits is closed and being energized.

The clutch members 124 and 125 comprise the driven members of the two magnetic clutches for controlling the rotation of the pinions 120 and 121, the drive member for said driven member 124 being magnetic, represented at 134 and mounted on a horizontal shaft 135 for rotation therewith and axial movement therealong, and the drive member for said driven member 125 being magnetic, represented at 136 and mounted on a horizontal shaft 137 for rotation therewith and axial movement therealong. The shafts 135 and 137 are coaxially aligned with the shafts 118 and 119 carrying their respective driven clutch members 124 and 125 and carry their respective drive members 134 and 136 in adjacency to said driven clutch members, so that, upon the closing of the circuit containing said member 124, the latter will draw said member 134 along its shaft 135 into driving relationship therewith, or, upon the closing of the circuit containing said member 125, the latter will draw said member 136 along its shaft 137 into driving relationship therewith. The shafts 135 and 137 are supported for rotation about their axes and for movement with the casing 116 by means of a pair of brackets 138 and 139 fixedly carried by and within said casing.

For rotating the shaft 135 about its axis in order, when the circuit containing the clutch member 124 is closed, to drive said member by the clutch member 134, a bi-directional motor 142 is employed and is mounted on the casing 116 with its drive shaft extending into said casing in coaxial alignment with the axis of the screw 110, so that rotation of said casing with the arbor 58 and spindle 64 is not only about the axis of said screw but about the axis of said drive shaft as well. The inner end of the motor shaft carries for rotation therewith a bevel pinion 143 which is in constant driving mesh with a bevel gear 144 carried on and for rotation with the lower end of a vertical shaft 145 journalled for rotation in the bracket 138 and an accompanying bracket 146 rigidly carried by and within the casing 116. Above the gear 144 the shaft 145 rotatably carries or is formed with a worm 147 which is in constant driving mesh with a worm gear 148 carried on and for rotation with a horizontal shaft 149 journalled in or supported by a bracket 150. The shaft 149 is parallel with and spaced from the axes of the shafts 118 and 135 and fixedly carries at one of its ends for being driven thereby a pinion 151 which is in driving mesh with a gear 152 carried on and for rotation with said shaft 125. Since the power for rotating the shaft 135, which rotation drives the drive member 134 of the clutch 124—134, comes to said shaft from the motor 142, to the pinion-gear 143—144 and the worm-gear 147—148, therefrom to the pinion 151, and from the latter to the gear 152, it is clear that the relationship of the effective diameters of said pinion 151 and said gear 152 may be changed substantially at will for obtaining various rotative speeds of said shaft 135. On the other hand, since speed reduction is brought about at the pinion-gear 120—113, it may not be necessary to provide for any reduction at the pinion-gear 151—152, in which event power for the shaft 135 will be taken directly off the shaft 145 instead of as shown.

The motor 142 also provides the source of rotative power for the shaft 137 which carries the drive member 136 of the clutch 125—136 for controlling the rotation of the pinion 121, the shaft of said motor carrying thereon for rotation therewith a pinion 154 which is in constant driving mesh with a gear 155 fixed on and for rotation with said shaft 137. The rotation of the motor 142, therefore, causes the simultaneous rotation of the pinions 154 and 143 with the result that the clutch members 136 and 134 simultaneously rotate, either of said members being ready, therefore, to drive its respective driven member 125 or 124 upon the closing of the circuit containing same. Since the motor 142 bodily rotates with the casing 116, it has been found desirable to connect its leads to ring conductors 158 which are properly insulated from and externally secured to said casing for movement therewith, said conductors being in permanent, sliding engagement with conductors 159 anchored to the stationary housing 107.

The purpose of providing the screw 110 with two or more rotative speeds is to enable the spindle 64 to carry the tool relatively rapidly into and out of engagement with the work and to enable said spindle to move said tool relatively slowly over said work.

Although the invention has been described with some detail, it is not intended that such description is to be definitive of the limits of the inventive idea. The right is reserved to make such changes in the details of construction and arrangement of parts as will fall within the purview of the attached claims.

What I claim is:

1. In a machine of the character described, an elongated support having and being movable about an axis of rotation, a second elongated support operable for carrying a tool and carried by said first support for movement unitarily therewith about said axis and relatively thereto along said axis, an elongated screw drive supported in threaded engagement with said second support and normally movable unitarily therewith about said axis, a third support also carried by said first support for movement unitarily therewith about said axis, a driven member carried by said screw drive for movement unitarily therewith about said axis, a driving member carried in continuous engagement with said driven member by said third support for movement normally unitarily with said last mentioned member and support about said axis, and means operatively connected to said driving member for selectively moving the latter relatively to said driven member about an axis spaced from and movable about said first axis, whereby the resulting differential between the movements of said driving and driven members establishes a differential between the movements of said second support and screw drive about said first axis and a movement of said second support relatively to said screw drive along said first axis.

2. In a machine of the character described, an elongated support having and being movable about an axis of rotation, a second elongated support operable for carrying a tool and carried by said first support for movement unitarily therewith about said axis and relatively thereto along said axis, an elongated screw drive supported in threaded engagement with said second support and normally movable unitarily therewith about said axis, a third support also carried by said first support for movement unitarily therewith about said axis, a member carried by said screw drive for movement unitarily therewith about said axis and formed concentrically about the latter with an annular driven surface, a second member carried by said third support for movement unitarily therewith and normally unitarily with said first member about said axis and formed with an annular driving surface in continuous cooperation with said driven surface and concentric about an axis spaced from and parallel with said first axis, and means operatively connected to said second member for selectively moving the latter relatively to said first member about said second axis, whereby the resulting differential between the movements of said driving and driven surfaces establishes a differential between the movements of said second support and screw drive about said first axis and a movement of said second support relatively to said screw drive along said first axis.

3. In a machine of the character described, an elongated support having and being movable about an axis of rotation, a second elongated support operable for carrying a tool and carried by said first support for movement unitarily therewith about said axis and relatively thereto along said axis, an elongated screw drive supported in threaded engagement with said second support and normally movable unitarily therewith about said axis, a third support also carried by said first support for movement unitarily therewith about said axis, a pair of driven members carried by said screw drive for movement unitarily therewith about said axis, a pair of driving members each carried in continuous engagement with one of said driven members by said third support for movement normally unitarily with said last mentioned member and support about said axis, and means operatively connected to each of said driving members for selectively moving the latter individually relatively to the respective driven member about an axis spaced from and movable about said first axis, whereby the resulting differential between the movements of the selected driving member and driven member establishes a differential between the movements of said second support and screw drive about said first axis and a movement of said second support relatively to said screw drive along said first axis.

4. In a machine of the character described, an elongated support having and being movable about an axis of rotation, a second elongated support operable for carrying a tool and carried by said first support for movement unitarily therewith about said axis and relatively thereto along said axis, an elongated screw drive supported in threaded engagement with said second support and normally movable unitarily therewith about said axis, a third support also carried by said first support for movement unitarily therewith about said axis, a pair of members carried by said screw drive for movement unitarily therewith about said axis and each formed concentrically thereabout with an annular driven surface, a second pair of members carried by said third support for movement unitarily therewith and normally unitarily with said first pair of members about said axis and each formed with an annular driving surface in continuous cooperation with one of said driven surfaces and concentric about an axis spaced from and parallel with said first axis, and means operatively connected to each member of said second pair for selectively moving the latter individually relatively to the respective member of said first pair about the respective second mentioned axis, whereby the resulting differential between the movements of the selected driving surface and driven surface establishes a differential between the movements of said second support and screw drive about said first axis and a movement of said second support relatively to said screw drive along said first axis.

5. In a machine of the character described, an elongated support having and being movable about an axis of rotation, a second elongated support operable for carrying a tool and carried by said first support for movement unitarily therewith about said axis and relatively thereto along said axis, an elongated screw drive supported in threaded engagement with said second support and normally movable unitarily therewith about said axis, a third support also carried by said first support for movement unitarily therewith about said axis, a gear member concentrically arranged with respect to said axis and movable thereabout unitarily with said screw drive, a pinion member carried in continuous engagement with said gear member by said third support for movement about said axis unitarily with said third support and normally unitarily with said gear member, and means operatively connected to said pinion member for selectively moving the latter relatively to said gear member about an axis spaced from and movable about said first axis, whereby the resulting differential between the movements of said gear and pinion members about said axes establishes a differential between the movements of said second support and screw drive about said first axis and a movement of said second support relatively to said screw drive along said first axis.

6. In a machine of the character described, an elongated support having and being movable about an axis of rotation, a second elongated support operable for carrying a tool and carried by said first support for movement unitarily therewith about said axis and relatively thereto along said axis, an elongated screw drive supported in threaded engagement with said second support and normally movable unitarily therewith about said axis, a third support also carried by said first support for movement unitarily therewith about said axis, a pair of gear members concentrically arranged with respect to said axis and movable thereabout unitarily with said screw drive, a pair of pinion members each carried in continuous engagement with one of said gear members by said third support for movement about said axis unitarily with said third support and normally unitarily with the respective gear member, and means operatively connected to each of said pinion members for selectively moving the latter individually relatively to the respective gear member about an axis spaced from and movable about said first axis, whereby the resulting differential between the movements of said gear and pinion members about said axes establishes a differential between the movements of said second support and screw drive about said first axis and a movement of said second support relatively to said screw drive along said first axis.

7. In a machine of the character described, an elongated support having and being movable about an axis of rotation, a second elongated support operable for carrying a tool and carried by said first support for movement unitarily therewith about said axis and relatively thereto along said axis, an elongated screw drive supported in threaded engagement with said second support and normally movable unitarily therewith about said axis, a third support also carried by said first support for movement unitarily therewith about said axis, a gear member concentrically arranged with respect to said axis and movable thereabout unitarily with said screw drive, a shaft carried by said third support in spaced parallelism to said axis and movable unitarily with said third support about said axis, a pinion member concentrically arranged about the axis of said shaft and carried thereby in continuous engagement with said gear member, and means operatively connected to said shaft for selectively moving said pinion member relatively to said gear member about said shaft axis, whereby the resulting differential between the movements of said gear and pinion members about said first axis establishes a differential between the movements of said second support and said screw drive about said first axis and a relativity therebetween along said latter axis.

8. In a machine of the character described, an elongated support having and being movable about an axis of rotation, a second elongated support operable for carrying a tool and carried by said first support for movement unitarily therewith about said axis and relatively thereto along said axis, an elongated screw drive supported in threaded engagement with said second support and normally movable unitarily therewith about said axis, a third support also carried by said first support for movement unitarily therewith about said axis, a pair of gear members concentrically arranged with respect to said axis and movable thereabout unitarily with said screw drive, a pair of shafts carried by said third support in spaced parallelism to each other and to said axis and movable unitarily with said third support about said axis, a pair of pinion members concentrically arranged about the axes of said shafts and carried thereby in continuous engagement with said gear members, and means operatively connected to said shafts for selectively moving said pinion members individually relatively to the respective gear members about the respective shaft axes, whereby the resulting differential between the movements of the selected gear member and pinion member about said first axis establishes a differential between the movements of said second support and said screw drive about said first axis and a relativity therebetween along said latter axis.

HENRY EARL MORTON.